May 25, 1937.  J. M. UNK  2,081,690
DEVICE FOR THE MEASURING AND COMPARING OF ELECTRICAL IMPEDANCES
Filed July 22, 1933  2 Sheets-Sheet 1

Inventor:
Jacob M. Unk,
by E. F. Neudarth
Att'y.

May 25, 1937.  J. M. UNK  2,081,690
DEVICE FOR THE MEASURING AND COMPARING OF ELECTRICAL IMPEDANCES
Filed July 22, 1933  2 Sheets-Sheet 2
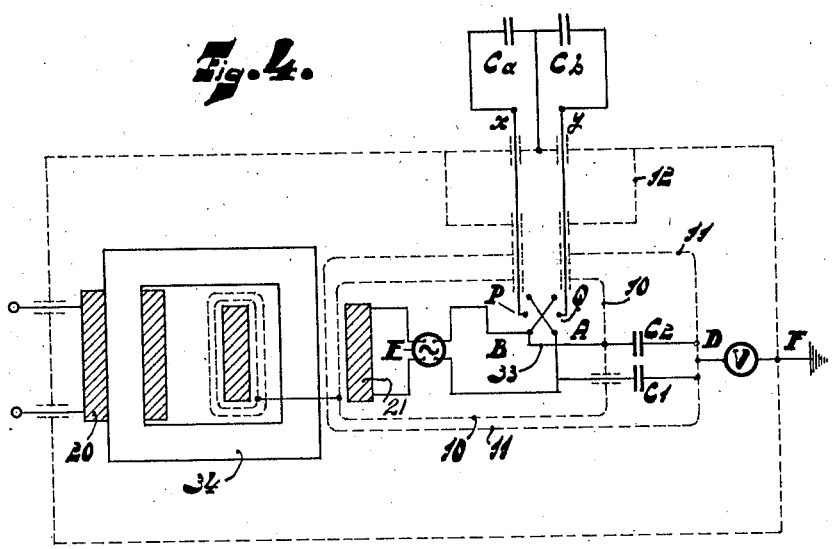
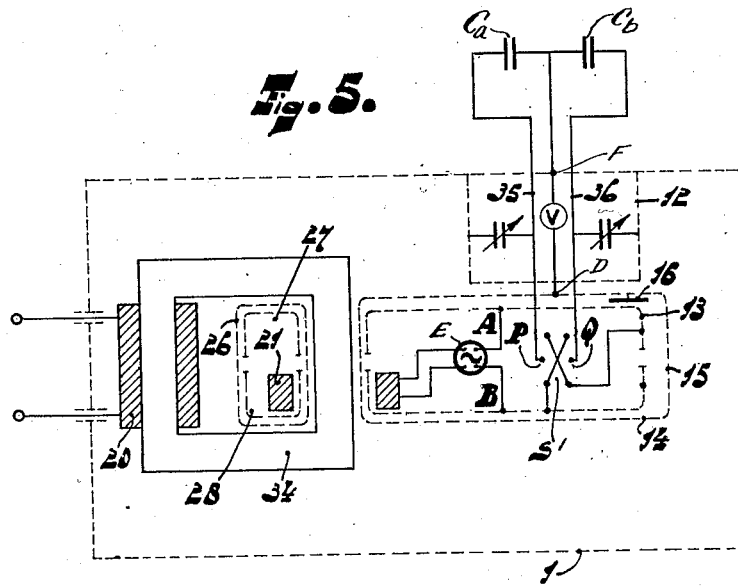
Inventor:
Jacob M. Unk, Patented May 25, 1937

2,081,690

UNITED STATES PATENT OFFICE 2,081,690

DEVICE FOR THE MEASURING AND COMPARING OF ELECTRICAL IMPEDANCES

Jacob Marinus Unk, Eindhoven, Netherlands, assignor, by mesne assignments, to Radio Corporation of America, New York, N. Y., a corporation of Delaware Application July 22, 1933, Serial No. 681,791
In Germany July 19, 1932

5 Claims. (Cl. 175—183)

My invention relates to devices for the measuring and comparing of electrical impedances and more particularly to devices and methods by means of which such measurements can be made with a high degree of accuracy and the disturbing influences of stray or parasitic impedances can be properly compensated for or is altogether eliminated.

The measuring and matching of impedances with a high degree of accuracy has an increasing practical importance in electrical engineering.

This is especially true with regard to radio apparatus and for instance in radio-receiving devices tuned by the adjustment of a single dial, the increasing requirements imposed upon the quality of such sets, especially the requirement of high selectivity makes the accurate determination and matching of the impedances of the circuits of such sets of prime importance.

The devices and methods used in the measuring and comparing of these impedances, besides of requiring high accuracy, also have to meet the general requirements of mass production, i. e., these measurements have to be simple, consuming but little time and adapted to be performed by but little skilled labor.

The most suitable method of measuring and comparing impedances is by the well-known Wheatstone bridge arrangement. However, in view of the small values of the capacities and impedances used in these circuits and of the high frequencies at which these devices are used and thus the tests have to be made, considerable difficulties are introduced.

This is primarily due to the fact that in these high frequency tests the influence of so-called stray or parasitic impedances and especially of parasitic capacities occurring between the component parts of the device and between such parts and the surroundings, vitally affect the measurements and distort the results.

The object of my invention is the elimination or neutralization in such tests of the parasitic impedances and especially of parasitic capacities.

A further object of my invention is to obtain the above result by simple means and to provide for devices in which such measurements can be made in a quick manner and by substantially unskilled labor. Further objects of my invention will appear as the specification progresses.

To neutralize the stray impedances in such devices, it has been already suggested to screen from each other the various component parts by means of casings made of conductive material which are interconnected to each other and/or connected to ground.

In the known devices the bridge is screened from the surroundings and from the high frequency generator supplying the measuring current, whereby as a rule one terminal of this generator is grounded.

When a high frequency dynamo is used its windings must be statically screened from each other. This entails considerable losses and requires the dynamo to be greatly over dimensioned compared to the actual energy requirement of the bridge. As the generator represents a major portion of the cost of the device, it is evident that such a device has unduly high initial cost and is uneconomical in operation.

According to the present invention the bridge is directly connected to the high frequency generator and the bridge and the generator are surrounded by a metallic screen or housing which is connected to one of the two points of the bridge between which the measuring instrument is connected, preferably to that point of the two, which also forms the common connecting point of the two impedances to be compared. If desired, the low frequency generator, for instance, an alternating transformer the primary of which is connected to the regular network and the secondary winding of which is connected with the high frequency generator, may be also surrounded by the screen.

The individual components of my device are also preferably screened from each other, but this is achieved substantially without energy losses.

The screening of the device from the surroundings is transferred to the low frequency transformer, whose secondary winding is screened from the surroundings and preferably also from the primary winding and the core of the transformer. As the frequency of the transformer current is low, there are practically no losses caused by such screening and even if such losses do occasionally occur they do not appreciably increase the cost, or cost of operation of the device.

According to a further feature of my invention, the parasitic impedances which may occasionally occur in operation, are caused to neutralize each other in a very simple manner.

Further advantages of my invention appear from the following description in which the invention is described more fully with reference to some embodiments.

In the drawings forming part of the specification.

Figs. 2 to 5 are circuit diagrams illustrating various embodiments of my invention.

Fig. 1 shows a Wheatstone bridge arrangement in which the impedances to be compared $Z_1$ and $Z_2$ form two branches of the bridge. $C_1$ and $C_2$ which are known impedances and are preferably capacities which form the two other bridge branches. The capacities $C_1$ and $C_2$ are made as closely equal as possible.

Connected between the common points A and B of the capacity $C_1$ and impedance $Z_1$ and of the capacity $C_2$ and impedance $Z_2$ respectively is the high frequency generator E, for instance, a high frequency discharge tube generator or a high frequency dynamo.

Between the common points D and F of the capacities $C_1$ and $C_2$ and of the impedances $Z_1$ and $Z_2$ respectively, is connected the measuring instrument V. As a rule, to increase the voltage across the instrument V one or more amplifying stages are introduced between the points D and F and the meter V.

To obtain a high degree of accuracy, the stray impedances connected in parallel to the arms of the bridge should be equal among themselves, and on the other hand coupling impedances between the bridge arms have to be avoided.

For this purpose, the component parts are screened and the screens connected to one point of the bridge.

Also, the influence of the impedances between the points A, B, C and D of the bridge and the surroundings are to be avoided. For this purpose according to the invention the bridge circuits together with the high frequency generator and the transformer, are surrounded by a metallic housing which is connected to the point F forming the common point of the two impedances $Z_1$ and $Z_2$.

As both or at least one of the impedances $Z_1$ and $Z_2$ has to be quickly replaceable, I arrange same outside of the screening housing.

In the arrangements according to the invention the device has an electrically fixed surrounding and due to the individual screening of the component parts, such stray or parasitic impedances which might occur, can be neutralized in a simple manner.

Figure 2:
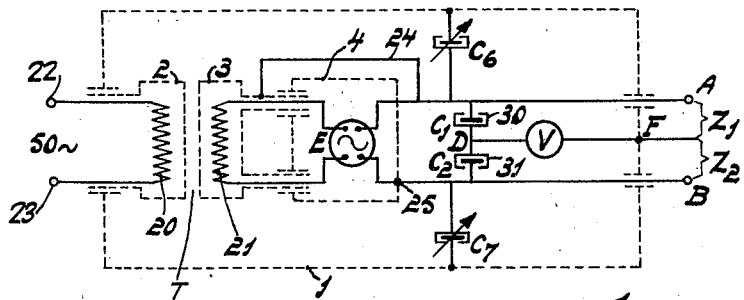

Figure 2 represents by way of example a form of construction according to the invention for the measuring of an impedance or for comparing two impedances.

The entire device is surrounded by a metallic housing 1, indicated in dotted lines, this housing being preferably connected to the point F above identified.

The two impedances $Z_1$ and $Z_2$, of which one is a standard if the other is to be measured, or which are the two impedances to be compared, are connected between the points A—F and B—F respectively. The condensers $C_1$ $C_2$ are connected between the points AD and BD respectively. It should be well understood that all of the connections between the instrumentalities of the bridge should be as short as possible.

To eliminate the influence of parasitical impedances existing between the points A, B, D, F and the surroundings, these have to be determined and their effect neutralized.

The impedance between points D and F, while reducing the sensitiveness of the arrangement do not cause any error in the measurement.

The impedances existing between the casing 1 and the points A and B respectively are in parallel with the bridge arms A—F and B—F respectively, and should be made equal as far as possible.

According to the invention it is possible to use the regular alternating current network for the supply of the measuring current without any disturbing influences.

For this purpose I provide between the network terminals 22—23 which supply the standard 50 or 60 cycle 110 or 220 volt alternating current and the high frequency generator E, a transformer T having a primary winding 20 connected across the terminals 22 and 23, and a secondary winding 21 connected to the generator E.

While in the drawings the generator E is shown schematically, it is to be understood that the generator may comprise any type of high frequency generator which may be energized by power taken out of the commercial power outlet, as for instance terminals 22 and 23 of Fig. 2. The energy is fed to the generator E through the transformer T and the output is taken out of the generator E by the other two terminals, as shown. In other words, the low frequency source is utilized to energize the high frequency source.

The windings 20 and 21 are wound on the transformer core at a sufficiently large distance from each other to reduce the intercapacity effect between each other to a negligible amount.

The primary winding 20 is surrounded by a metallic screen 2, and the secondary winding together with its leads is surrounded by a metallic screen 3. The screen 3 is connected to the point A as indicated at 24.

The generator E is surrounded by a metallic screen 4, which is connected to the point B as indicated at 25.

As further measures to obviate disturbing influences the capacity between the metallic screens or casings 1 and 4 has to be kept as small as possible, and the secondary winding 21 and the generator screen 4 have to be insulated from the casing 1 in such a manner as to keep the dielectric losses low. This also applies to the insulation of condensers $C_1$ and $C_2$, which furthermore are also to be provided with screens 30 and 31, so as to avoid any change in the values of the parasitic capacities existing across A and B when the capacities $C_1$ and $C_2$ are changed.

Furthermore, if very high frequencies are used for the testing, the component parts of the bridge are to be placed on glass insulators so as to avoid losses. For the same reason the inside of the metallic casings should not be provided with insulating coatings, but left bare.

To eliminate the effect of the parasitic impedances I connect variable condensers $C_6$ and $C_7$ between the housing 1 and the points A and B respectively, by means of which these impedances are caused to neutralize each other.

Figure 1:
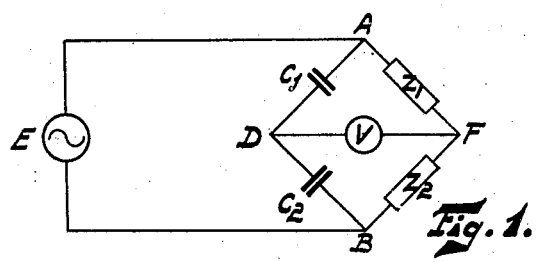
Figure 1 is a schematic diagram representing the well known Wheatstone bridge connection used for such measurements.
Figure 3:
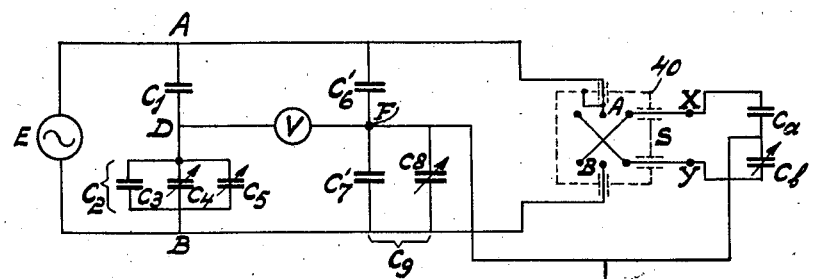

Figure 3 shows a modification of the device of Fig. 1 which provides a very exact compensation of the capacities. In this figure the showing of the previously described shields has been omitted.

The condenser $C_1$ has a fixed capacity, however, the capacity of condenser $C_2$ is adjustable, this condenser in fact consisting of three individual capacities $C_3$, $C_4$ and $C_5$. Of there $C_3$ has a fixed capacity which is smaller than the $C_1$. $C_4$ is a variable capacity the knob of which is accessible from the outside. $C_5$ is a small adjusting condenser, by means of which condenser $C_2$, is so adjusted that in the middle position of condenser $C_4$ the capacities $C_1$ and $C_2$ are equal.

The capacity of the condenser $C_4$ is a given fraction of capacity $C_3$ and changes linearly with the angular position of its pointer. Adjustment of $C_4$ causes the condensers $C_1$ and $C_2$ to differ by a given percentage and the reading on the scale of this condenser gives the difference of the value of the compared impedances $Z_1$ and $Z_2$ also in percentage.

The parasitic capacities between the points A—F and B—F are represented by capacity value $C'_6$ and $C'_7$ respectively. If these capacities are found unequal a corresponding portion of an adjustable capacity $C_8$ is added to the side having the smaller capacity value. For instance, if $C'_7$ is smaller than $C'_6$ the combined capacity $C_9 = C'_7 + C_8$ should be equal to $C'_6$.

To determine the proper adjustments of condensers $C_5$ and $C_8$ the following procedure is used.

To the points A and B of the device is connected a changeover switch S, which in its both positions connects these points to outside terminals X and Y but with reversed polarity. The switch S is enclosed in a metallic screening casing 40, which is connected to one of the points A or B (in the figure to point A).

Two condensers $C_a$ and $C_b$, of which one, for instance $C_b$, has to be variable, are now connected with one of their electrodes to the points X and Y, the other electrodes of these condensers being connected to the grounded point F.

By the proper adjustment of the variable condensers $C_b$, $C_5$ and/or $C_8$, an adjustment can be obtained whereby the voltmeter V remains at zero in either position of the switch S.

For this condition the equations hold.

$$\frac{C_1}{C_2} = \frac{C'_6 + C_a}{C_9 + C_b} \text{ and } \frac{C_1}{C_2} = \frac{C'_6 + C_b}{C_9 + C_a}$$

From which it appears that $C_a = C_b = C$.

Such adjustment is preferably obtained for two values of C.

For the first adjustment C is selected to have a value which is large compared to $C'_6$ (or $C'_7$). Now $C_5$ is adjusted to obtain the above equations while retaining $C_8$ constant, and thereby the values $C_1$ and $C_2$ are made to closely equal. For the second adjustment C is selected either substantially equal or smaller than $C'_6$ (or $C'_7$) and while $C_5$ is held constant, $C_8$ is adjusted to obtain the conditions of the above equations. This adjusts $C_9$ to a value close to that of $C'_6$ (or $C'_7$).

To further increase the accuracy of the compensation the measurements, and adjustments if necessary, are repeated. The condensers $C_5$ and $C_8$ are then fixed at the adjusted values.

For the measuring or comparing of the impedances $Z_1$ and $Z_2$ these are again connected between the points A—F and b—F respectively, and the percentual difference between their values determined with the variable condenser $C_4$.

Fig. 4 shows an arrangement which reduces the number of condensers required and simplifies the adjustments.

In this case the generator is enclosed together with the change-over switch—which connects the points A and B to the points P and Q—in a common screening case 10, within which also falls the secondary winding 21 of the transformer T. The casing 10 is connected at 33 to the point B and is enclosed in a second screening casing 11 which also surrounds the condensers $C_1$ and $C_2$ and which is connected to point D.

The condenser $C_3$ may again consist of three condensers $C_3$, $C_4$ and $C_5$ as in the arrangement of Fig. 3.

The casings 10 and 11 form a condenser which is connected between the points B and D and thus by suitably dimensioning these casings, the intercapacity of these two casings may replace the fixed condenser $C_3$. Thus a saving of this capacity is achieved.

The casing 10 together with the voltmeter V, transformer core 34, and primary transformer winding 20, is enclosed in a screening casing 1 connected to the point F.

From the points P and Q of the switch lead wires 35 and 36 are led to the outside of the casing through suitable apertures.

To reduce the capacity between these leads and the point D, and eliminate errors due to it, when changing the switch S, from one position to the other, I prefer to provide a further screen 12 surrounding the leads 35 and 36 close to their point of exit from housing 11, the screen 12 falling within the screen 1 and being connected therewith.

Since now all of the component parts which are connected to points A and B are completely screened, capacities $C_6$ and $C_7$ become zero and the need for condenser $C_8$ does not exist.

Also the adjustment merely requires the determination of the proper value of $C_5$.

The screening of the transformer core 34 and of the primary winding 20 is not imperative as they merely form impedances parallel to the bridge arm D—F which, while causing losses and reducing the sensitivity of the device, do not give rise to inaccuracies in the measurement.

Fig. 5 shows a further modification. The generator and preferably also, the changeover switch S', are disposed within a two-part casing 13—14. The parts 13 and 14 are similar and insulated from each other, the casing 13 being connected to point A and the casing 14 to point B.

A second casing 15 surrounds casing 13—14 and is connected to D.

The transformer 34 passes through casing 13—14 and casing 15 and at this portion is surrounded by two sleeves, the outside sleeve 26 being connected to casing 15 and the inside sleeve being a two part sleeve 27—28 is connected to the respective portions 13 and 14 of the inner casing.

The arrangement is substantially fully symmetrical.

To nevertheless take care of any asymmetry I prefer to provide an adjustable plate 16 which may be connected to one of the casings.

In this arrangement the condensers $C_1$ and $C_2$ may be dispensed with and thus the number of condensers may be reduced to a minimum.

The high frequency generator may comprise one or more tubes, and an alternating or rectified anode voltage may be used for the tubes.

While I have described my invention on hand of specific embodiments and in specific applications, I do not wish to be limited to same, but desire the appended claims to be construed as broadly as possible in view of the prior art. In the claims the term "comparing of impedances" also includes the measuring of impedances.

What I claim is:—

1. A device for comparing impedances, comprising a bridge arrangement, the four branches of which comprise two known impedances and two impedances to be compared, a high frequency generator for feeding the bridge and a two-part screening casing surrounding the generator and having symmetrical halves insulated from each other, one of said halves being connected to one terminal of the generator and the other half being connected to the other terminal of the generator.

2. A device for comparing impedances, comprising a bridge arrangement, the four branches of which comprise two known impedances and two impedances to be compared, a high frequency generator for feeding the bridge and a two-part screening casing surrounding the generator and having symmetrical halves insulated from each other, one of said halves being connected to one terminal of the generator and the other half being connected to the other terminal of the generator, and a low frequency transformer having a primary winding, a secondary winding and a core, said secondary winding being associated with the high frequency generator to energize the same, and apertures through said casing through which said core passes, said secondary winding falling within said screening casing and a screening casing enclosing both the transformer secondary and the high frequency generator.

3. A device for comparing impedances comprising a bridge arrangement provided with four branches of which two comprise known impedances and two comprise impedances to be compared, a high frequency generator connected across opposite points of the bridge, a floating shield surrounding the generator, said excitation points of the bridge leading into the floating shield, an indicator device connected across the other two opposite points of the bridge, and means for connecting one end of the indicator device to the floating shield.

4. The device described in the next preceding claim further characterized by that there is provided a second shield connected to the other end of the indicator, said second shield surrounding the first shield and the balance arms of the bridge.

5. A device as described in claim 3 characterized by that the generator is balanced with respect to the shield by means of equal capacity effects provided from the two terminals of the generator to the shield.

JACOB MARINUS UNK.